US012424909B2

(12) United States Patent
Porde et al.

(10) Patent No.: US 12,424,909 B2
(45) Date of Patent: Sep. 23, 2025

(54) INTERFERENCE-SUPPRESSED LINEAR DRIVE

(71) Applicant: DewertOkin KFT, Kecskemét (HU)

(72) Inventors: Christoph Porde, Kecskemét (HU);
Péter Bartus, Tiszaalpár (HU); Attila Kása, Kecskemét (HU)

(73) Assignee: DEWERTOKIN KFT, Kecskemét (HU)

( * ) Notice: Subject to any disclaimer, the term of this patent is extended or adjusted under 35 U.S.C. 154(b) by 953 days.

(21) Appl. No.: 17/596,548

(22) PCT Filed: Jun. 12, 2020

(86) PCT No.: PCT/EP2020/066312
§ 371 (c)(1),
(2) Date: Mar. 4, 2022

(87) PCT Pub. No.: WO2020/249735
PCT Pub. Date: Dec. 17, 2020

(65) Prior Publication Data
US 2022/0231580 A1    Jul. 21, 2022

(30) Foreign Application Priority Data

Jun. 14, 2019 (DE) ............ 20 2019 103 356.8
Dec. 17, 2019 (DE) ............ 10 2019 134 742.4

(51) Int. Cl.
*H02K 11/026* (2016.01)
*H02K 7/00* (2006.01)
(Continued)

(52) U.S. Cl.
CPC ........... *H02K 11/026* (2013.01); *H02K 7/003* (2013.01); *H02K 7/083* (2013.01); *H02K 7/1166* (2013.01);
(Continued)

(58) Field of Classification Search
CPC .......... H02K 5/10; H02K 7/003; H02K 7/083; H02K 7/1166; H02K 11/026;
(Continued)

(56) References Cited

U.S. PATENT DOCUMENTS 5,528,093 A   6/1996  Adam et al.
6,515,399 B1  2/2003  Lauf et al.
(Continued)

FOREIGN PATENT DOCUMENTS

CN    204538891    8/2015
DE      3513155   10/1986
(Continued)

OTHER PUBLICATIONS

International Search Report from corresponding PCT Appln. No. PCT/EP2020/066118, dated Sep. 3, 2020.
(Continued)

*Primary Examiner* — Emily P Pham
(74) *Attorney, Agent, or Firm* — Grossman, Tucker Perreault & Pfleger, PLLC

(57) ABSTRACT

To simplify assembly and to reduce the susceptibility to faults of a linear drive comprising a transmission housing, an interference-suppressed electric motor which is connected thereto and is accommodated in a motor housing and which by way of a rotor accommodated in the motor housing drives a shaft which is mounted on a rear shaft end in a rear shaft bearing and is mounted on a front shaft end, a commutator for the transmission of current to the rotor, electrical and/or electronic components for interference suppression of the electric motor, it is proposed that the rear shaft bearing is mounted in the motor housing, the front shaft bearing is mounted in the transmission housing and the electrical and/or electronic components required for interference suppression of the electric motor are arranged on an interference
(Continued)

suppression circuit board arranged between the front shaft bearing and the commutator.

19 Claims, 7 Drawing Sheets

(51) Int. Cl.
    *H02K 7/08*     (2006.01)
    *H02K 7/116*     (2006.01)
    *H02K 11/00*     (2016.01)

(52) U.S. Cl.
    CPC ...... *H02K 11/0094* (2013.01); *H02K 2211/03* (2013.01)

(58) Field of Classification Search
    CPC .... H02K 11/0094; H02K 11/33; H02K 11/01; H02K 11/20; H02K 11/02; H02K 2211/03; F16H 25/20; F16H 1/16; F16H 37/12; A47C 20/041; A47C 20/04; A47C 17/00; A61G 7/018
    See application file for complete search history.

(56) References Cited

U.S. PATENT DOCUMENTS

| | | |
|---|---|---|
| 10,716,406 B2 | 7/2020 | Koltzenburg |
| 11,183,900 B2 | 11/2021 | Oberndoerfer et al. |
| 2002/0149283 A1 | 10/2002 | Hager et al. |
| 2004/0093969 A1 | 5/2004 | Nielsen |
| 2005/0264109 A1 | 12/2005 | Abrahamsen |
| 2006/0091762 A1 | 5/2006 | Haneball et al. |
| 2010/0005590 A1 | 1/2010 | Jensen |
| 2013/0169088 A1 | 7/2013 | Wu |
| 2013/0285494 A1 | 10/2013 | Iversen et al. |
| 2014/0312725 A1 | 10/2014 | Oberndoerfer |
| 2014/0345404 A1 | 11/2014 | Wu |
| 2021/0018077 A1* | 1/2021 | Müller .................. F16H 25/20 |

FOREIGN PATENT DOCUMENTS

| | | |
|---|---|---|
| DE | 9013006 | 7/1991 |
| DE | 4244642 | 7/1993 |
| DE | 19858233 | 6/2000 |
| DE | 20108888 | 10/2002 |
| DE | 102007043984 | 8/2008 |
| DE | 102010013622 | 11/2010 |
| DE | 102009027370 | 1/2011 |
| DE | 202012000412 | 4/2012 |
| DE | 102010062727 | 6/2012 |
| DE | 102011055337 | 5/2013 |
| DE | 102012102790 | 7/2013 |
| DE | 102013108031 | 11/2014 |
| DE | 202016104185 | 11/2017 |
| DE | 202016106361 | 2/2018 |
| DE | 202018100747 | 3/2018 |
| DE | 202019103358 | 9/2020 |
| DE | 102019134752 | 12/2020 |
| EP | 0075777 | 4/1983 |
| EP | 0618659 | 10/1994 |
| EP | 2187097 | 2/2012 |
| EP | 3343056 | 7/2018 |
| WO | 2004071244 | 8/2004 |
| WO | 2013068329 | 5/2013 |
| WO | 2019001651 | 1/2019 |
| WO | 2019091997 | 5/2019 |

OTHER PUBLICATIONS

International Search Report from corresponding PCT Appln. No. PCT/EP2020/066312, dated Sep. 10, 2020.
International Preliminary Report on Patentability from corresponding PCT Appln. No. PCT/EP2020/066312, dated Dec. 14, 2021. English translation attached.
English translation of Search Report from related Chinese Appln. No. 202080057201.9, dated Apr. 17, 2025.

* cited by examiner

INTERFERENCE-SUPPRESSED LINEAR DRIVE

FIELD

The invention concerns a linear drive comprising a divisible transmission housing, an interference-suppressed electric motor which is connected to the transmission housing and is accommodated in a motor housing and by way of a rotor accommodated in the motor housing drives a shaft which is mounted on a rear shaft end in a rear shaft bearing and is mounted on a front shaft end. Current transmission to the rotor is effected by way of a commutator and the shaft drives a worm which in turn meshes with a worm gear which in turn is non-rotatably connected to a spindle on which there runs a spindle nut which is held non-rotatably and axially displaceably in a guide tube and is displaceable along the longitudinal axis thereof. The spindle nut is connected to a lift tube.

BACKGROUND

A linear transmission of that kind is preferably used for the automatic displacement of moveably mounted parts of lying and seating furniture, therefore furniture items.

A linear drive of the general kind set forth is known from WO2013/068329 to the present applicant. Further state of the art is known from CN204538891U, WO2019/091997A1, WO2013068329A1, US2013/0285494A1, DE202016104185U1, DE19858233A1, DE102009027370A1, DE102011055337 A1, DE 102012102790A1, DE9013006U1, DE20108888U1 and DE202012000412U1.

In linear drives of that kind the interference-suppressed electric motor is designed in the form of a closed unit which includes a pot-shaped motor housing in which the rotor of the electric motor, that is carried on the shaft, and the electrical components for operation of the electric motor are accommodated, for example circuit boards, the commutator, the brushes for power supply to the commutator, diodes, Hall sensors for travel measurement, capacitors and coils for interference suppression of the motor and the corresponding lines. The motor housing of a pot-shaped closed configuration is closed at the front side by a metal plate which is frequently also referred to as the bearing shield or plate and through which the driven motor shaft projects out of the motor housing. That bearing plate is usually crimped to the motor housing preferably made of steel, or is fixed in positively locking relationship in some other way and usually has on the front side holes for fixing to the transmission housing.

Disadvantages in the State of the Art

A linear drive or transmission known from the state of the art usually comprises the following "electronic components" which are arranged on separate circuit boards and which have to be individually fitted and connected or wired up:
- connection for ordered distribution (for cost reasons that can be done without a circuit board and in the form of "free multiwiring"; usually a pluggable motor cable is then also provided to be able to connect the drive to the control system);
- brush carrier for contacting or current supply to the commutator;
- limit switches (two mutually spaced limit position switches with an associated diode and connecting lines are arranged on a busbar); and
- Hall sensors only in relation to such drives in which travel information is to be detected.

Those individual circuit boards and possible further circuit boards are installed separately in the motor housing. Assembly and installation of the individual components in the tight structural space in the motor housing with the rotating rotor and the rotating commutator with all the cabling is relatively complicated and expensive in regard to assembly. The structural space is also restricted by the limitation imposed by the motor housing. If lines have to be taken past the brush carrier or the brushes that is particularly critical if the lines were to come into contact with the rotating parts and could be in part damaged. In the state of the art a plurality of separate circuit boards are usually provided, which have to be installed separately within the motor housing and connected together by way of lines so that for example the brush carrier for connection to the commutator, a circuit board for evaluation of the signals from the limit switches which usually delimit the position and the range of movement of the spindle nut, a circuit board with Hall sensors for detecting the rotary movement of the rotor and the interference suppression circuit board on which the electrical and/or electronic components for reducing radio frequency interference are already arranged at the source, for example by smoothing the current rise in the case of switching processes by series resistors, capacitors and chokes.

Frequently in addition there is also a relay circuit board which is arranged separately and externally and having at least one relay with which the relatively strong motor current can be controlled by way of the limit switches for limiting the displacement travel of the spindle nut.

Technical Problem/Object

Taking the above-mentioned state of the art and the disadvantages linked thereto as the basic starting point the technical problem/object of the invention is to provide a linear drive of the general kind set forth, which at least partially avoids the disadvantages referred to in the opening part of this specification and which in particular is easier to assemble and in which in that respect there is a lower susceptibility to faults upon assembly and thus a lower reject rate.

SUMMARY

In the simplest embodiment therefore the rear shaft bearing is mounted in the motor housing and the front shaft bearing is arranged or mounted in the transmission housing. In addition at least the electrical and/or electronic components required for interference suppression of the electric motor are arranged on an interference suppression circuit board arranged between the front shaft bearing and the commutator. The electrical and/or electronic components include in particular one or more chokes and at least one capacitor.

According to the invention the interference suppression circuit board is arranged in the region between the transmission and the motor, which means that the motor housing which is preferably of a pot-shaped configuration and is therefore closed at the rear end and open at the front so that the interference suppression circuit board can so-to-speak be arranged outside the motor housing and preferably also is, that is to say it can be supported in the transmission housing in which naturally there is substantially more space for assembly and cable fitment so that the assembly operation can be carried out more quickly, more easily and with less susceptibility to fault. In addition that configuration affords the advantage that the formerly plurality of separate circuit boards can be arranged integrated on the interference suppression circuit board so that a plurality of separate circuit boards no longer have to be installed and wired together and tested for correct operability, and this further reduces the susceptibility to faults and considerably simplifies assembly. According to the invention therefore only the main wiring has to be arranged in the region between the worm gear and the commutator.

All electromagnetic waves which in wired and wireless relationship can have effects on surrounding electrical devices are interference-suppressed by the appropriate arrangement of coils and capacitors.

The linear drive is preferably used as a furniture drive, particularly preferably for adjusting a pivotable head or foot part of a sick bed. It will be appreciated by the man skilled in the art that it can be used generally for the displacement of mechanical devices of any kind, in particular for displacement of a moveable component in relation to a stationary component.

Preferably the interference suppression circuit board also has all required electrical connections.

In addition the interference suppression circuit board preferably has all wiring assemblies in the form of conductor tracks so that all electronic components can be soldered on or plugged in.

The interference suppression circuit board therefore preferably includes the connection for ordered distribution, the brush carrier, at least one limit switch and preferably one or more Hall sensors on a circuit board.

In the configuration according to the invention also the motor housing encloses the rotating roller with the driven shaft and preferably carries the permanent magnets which externally surround the rotor in the installed position so that this provides an electric motor affording good efficiency, smooth running and good effectiveness. Preferably the motor housing is in the form of a deep-drawn metal part or a deep-drawn steel body or steel pot.

The transmission housing is preferably in the form of a plastic injection molding.

Preferred embodiments include fixing the interference suppression circuit board to the transmission housing. According to the invention that can now be implemented in the entire region between the front end of the motor housing and the beginning of the transmission parts in the transmission, and that considerably simplifies installation and wiring.

Preferably the interference suppression circuit board includes a brush holder and/or a limit switch and/or a relay and/or a cable plug which can thus be arranged integrally on the interference suppression circuit board.

In contrast to the state of the art therefore the motor housing is basically of an open configuration, which means that it does not include a front bearing plate which limits the structural space. Accordingly therefore regions can be used outside the motor housing but within the transmission housing for arranging components or constituent parts. Thus for example the front bearing which is otherwise provided in the bearing plate, for supporting the shaft, can be arranged in the transmission housing, which markedly improves the running smoothness of the shaft.

In a preferred development the transmission housing includes a separating wall which subdivides the transmission housing into a transmission portion with the transmission components and provided with grease and a rear portion which is towards the motor housing and in which the motor housing is arranged or accommodated in the transmission housing.

In the preferred embodiment that separating wall includes a through opening for the shaft and is particularly preferably provided with a bearing seat into which the front shaft bearing can be fitted for supporting the shaft. A preferred embodiment further provides a corresponding seat for receiving a sealing element, in particular a radial shaft sealing ring which in the installed position is arranged coaxially with the front shaft bearing around the shaft.

The motor housing can also be designed in particular for accommodating the rear bearing, which is preferably effected by the provision of a preferably cylindrical bearing receiving means of preferably reduced diameter in relation to the motor housing, in which the rear bearing can be fitted. That bearing receiving means can for example be in the form of a reduced cylindrical protrusion on the motor housing, that is adapted to accommodate or mount the rear bearing.

Accordingly the shaft of the electric motor at the end which is the rear end in the installed position and which is provided with the electric motor is mounted in the motor housing while at the front end provided with the worm it is supported in the transmission housing, preferably in a separating wall of the transmission housing.

Accordingly in accordance with the invention the region between the commutator and the front bearing location in the transmission housing is available for arranging the interference suppression circuit boards and wiring relating thereto, which can also be particularly easily reached upon assembly or for maintenance.

Optionally there can also be provided a motor pot, that is to say a component which again externally encloses the motor housing and which can be connected to the transmission housing at a fixing edge. That motor pot can be provided for further sealing integrity of the motor housing in order in particular to afford a high IP certification or protection for a splash water-tight or pressure water-tight configuration of the linear transmission. In addition that motor pot externally conceals the motor housing so that the motor pot does not act or is not seen as a separate component but an integral component of the linear transmission.

It is however also sufficient if only the motor housing is connected to the transmission housing, which is effected in particular in sealing relationship in order to give the desired IP certification or seal. Preferably that is achieved in that a sealing agent in the form of silicone or the like is provided between the outer peripheral surface of the motor housing and the inner peripheral surface of the transmission housing, the sealing agent permanently sealing off the gap or annular clearance between the join partners. Or, in other words, the motor housing engages into the transmission housing in sealing relationship and is therefore sealingly fitted into same.

To increase stiffness the motor housing can have a radially outwardly widening step which is preferably formed in the region of the front third of the motor housing so that a rear motor housing region of the motor housing is formed of smaller outside diameter and a front motor housing region is formed with a front motor housing region which is increased by preferably 10 to 20 percent with respect to the rear motor housing region. Preferably that front motor housing region engages into the transmission housing or is connected thereto, preferably being fitted into same.

Preferably the interference suppression circuit board further includes the carbon brushes for connection or operation to the commutator. Particularly preferably those carbon brushes or holder for the carbon brushes are arranged integrally on the circuit board but can also be fixed thereon at an additional component which can be snap-fitted on to same.

Preferably in addition at least one limit switch is arranged on the interference suppression circuit board. In the preferred embodiment that limit switch is arranged on the side which is the front side in the installed position and a thrust rod sits with a rear end in that limit switch, wherein a front end is mounted relatively displaceably in a receiving wall in the transmission housing and is particularly preferably covered over with a rubber cap.

In addition the interference suppression circuit board can include at least one relay, with which the relatively great motor current of about 6 amperes for the electric motor can be controlled by way of the limit switches.

For accurate travel measurement of the shaft and the rotor respectively the interference suppression circuit board in the preferred embodiment includes at least one Hall sensor, preferably two Hall sensors, which externally or radially peripherally enclose the shaft, that is to say are arranged around a through opening for the shaft. Instead of the Hall sensors it is also possible to use optical or GMR sensors.

In the preferred embodiment the transmission housing is of a multi-part configuration, in particular in two parts, and preferably includes a housing part adapted for connection to the electric motor, which in particular has a connecting piece for receiving the motor housing, as well as a housing cover for closing the transmission housing.

The housing parts are preferably adapted to be divisible for assembly and maintenance. Preferably the housing parts bear against each other at a separation plane. In the case of a splash water-protected structure provided at the separation plane is a peripherally extending flange with a sealing element provided thereon, which preferably includes a sealing groove and a sealing projection or lip of a complementary configuration, which engage sealingly into each other in the installed position and thus seal off the join between the housing parts.

In the preferred embodiment the transmission which is driven by the electric motor includes a worm gear which is driven by the worm and which in turn is or can be non-rotatably connected to a spindle. The connection between the worm gear and the spindle can either be direct or however, which is preferred for implementing an emergency release, with the interposition of a clutch which releasably connects the worm gear to a spindle holder non-rotatably carrying the spindle. For example the worm gear can include a lateral splined shaft connecting piece and the spindle holder has a splined shaft flange of complementary configuration which projects radially from a cylindrical receiving connecting piece for the spindle, being of a corresponding splined shaft or profile structure which corresponds to the profile structure of the inside of the clutch. In the rest position the clutch therefore connects the worm gear to the spindle holder and the clutch is only actuated for emergency disengagement, which is preferably effected by the clutch being pulled by clutch actuation against a force operative between same and the worm gear.

In the preferred embodiment a spindle nut connected to the lift tube runs on the spindle, which nut is held non-rotatably and axially displaceably in the guide tube and is displaceable along the longitudinal axis thereof.

A further embodiment provides for the integration of a brake in the interference suppression circuit board. In the preferred configuration the stationary magnets are arranged on the interference suppression circuit board. They can either be integrated directly therein or arranged in a magnet holder which can be fixed to the interference suppression circuit board.

In a development the interference suppression circuit board on the side facing away from the motor can include a Bluetooth module, wherein that module can also be arranged on a separate circuit board which is soldered to the interference suppression circuit board with solder points or is fixed in another suitable fashion. The Bluetooth module can also be arranged, in particular soldered, in the form of a chip directly on the interference suppression circuit board.

In the preferred configuration there is provided a bus system, in particular a CAN bus system, for communication of the processor with other components. Alternatively a proprietary bus structure in the manner of a 2 wire differential bus is used.

To ensure good electrical contacting to implement electrical screening which is as good as possible the interference suppression circuit board is preferably of a round configuration in the edge region of the motor housing preferably made from steel, at the outer peripheral edge. Contacting is preferably made directly with the housing, or alternatively by way of interpositioned contact means.

The outside diameter of the circuit board approximately corresponds to the outside diameter of the steel casing of the motor housing. In that case the circuit board sits at the end in front of the motor casing, contacts it and together with the steel casing forms a Faraday cage for the purposes of screening. The circuit board thus forms a shield against the EMV disturbances in the interior of the motor.

Particularly preferably it is adapted to provide contacting which is over the full area at the periphery, that is to say in the form of a full ring. Alternatively numerous individual contacts are provided, at least 5, preferably even more than 10.

In addition in a first simplified structure the interference suppression circuit board has supply connections which receive electrical power from a mains-connected voltage supply by means of a plug connection through an opening in a housing part, the transmission housing or the motor housing. There are provided at least two supply connections and preferably the supply connections carry electrical power only when the electric motor is to be operated.

In a further structure a permanent voltage is applied at the supply connections and the interference suppression circuit board has corresponding relay and/or semiconductor switches as mentioned in the opening part of this specification, which switch the electric motor on or off in the desired direction of rotation or switch it off when a predetermined position of the spindle nut coupled to the spindle is reached. For that purpose there can also be provided a control circuit for operation of the relay and/or semiconductor switches, the circuit also being arranged on the interference suppression circuit board. In any case however the interference suppression circuit board also has motor connections which are electrically conductingly connected to the brushes of the motor.

As described in the opening part of this specification the brush holder or the brush carrier is adapted to hold and guide carbon brushes, wherein the brushes themselves are always pressed by means of spring stressing in operation of the electric motor against the rotating collector or commutator. The electrical connection of the brushes to the motor connections can be effected by the spring itself, if it comprises an electrically conductive material. The spring itself is fixed to the brush holder and is electrically connected with the free end remote from the brush, to a motor connection of the interference suppression circuit board.

Alternatively the brush is provided with a flexible line connected to the corresponding motor connection. If the brush holder is made from an electrically conductive material each brush is fitted with such a holder, wherein each brush holder is soldered in material-bonded relationship and electrically conductingly to the respective corresponding motor connection.

In an embodiment in which the brush carrier is made from a plastic there are provided interference suppression components directly connected to the brush carrier. In that case the brush carrier can have for example electrical conductor tracks which are arranged fixedly and at least portion-wise at the surface of the brush carrier. Those conductor tracks are adapted to be soldered to electrical components like interference suppression components comprising capacitors and/or coils or chokes.

In another embodiment portions of those respective conductor tracks are electrically connected to the motor connections of the interference suppression circuit board. The connection is preferably in the form of a touching connection.

Preferably the interference suppression circuit board is provided double-sided with conductor tracks (dual layer printed circuit board). In the preferred embodiment all conductor tracks or a predetermined selection, in particular conductor tracks towards the motor (signal, control and ground lines) form a network for shielding, wherein the mesh width/spacing of those conductor tracks relative to each other is less than the wavelength of the electromagnetic interference waves to be avoided. The conductor tracks facing towards the motor interior are either ground surfaces or have a subordinate function, which are connected to ground by way of interference suppression components. The important conductor tracks with the important and sensitive electronics, whereby therefore small signals are transmitted, as well as the Bluetooth unit, are arranged on the side of the interference suppression circuit board that is remote from the motor/motor housing and thus faces towards the transmission.

Alternatively the interference suppression circuit board can be in the form of a multilayer circuit board with a further conductor track-carrying plane, wherein a plane/layer forms the shielding and can form an electrical potential, for example the ground potential.

An alternative embodiment provides for the arrangement of an electronic component in an external control housing. This can involve for example the Bluetooth radio module. In this structure the further internal region of the transmission housing adjoining the motor is preferably provided with an electrically conductive coating for shielding purposes.

Separately from the linear drive the invention further concerns an assembly, in particular for an above-described linear drive, including a transmission housing adapted to receive an interference suppression circuit board and for the arrangement of an electric motor which drives a transmission arranged in the transmission housing.

Further features and advantages of the invention will be apparent from the specific description hereinafter of preferred embodiments with reference to the accompanying drawings. As components of embodiments can be positioned in a number of differing orientations the directional terminology serves for illustration and is in no way limiting.

It will be appreciated that other embodiments can be used and structural or logical modifications can be made without thereby departing from the scope of protection of the present invention. The following detailed description is not to be interpreted in a limiting sense. In the context of this description the terms "connected", "joined" and "integrated" are used to describe both a direct and also an indirect connection, a direct or indirect join or direct or indirect integration. Identical or similar components are denoted by identical references in the Figures insofar as that is desirable. The views in the Figures are substantially true to scale. However certain regions can be shown on an enlarged scale as will be apparent to the man skilled in the art to illustrate details. In addition the drawings can be strikingly simplified and do not contain every detail which is possibly present in a practical implementation.

In the specific description directional terminology like for example "upward", "downward", "forward", "rearward", "front", "rear" and so forth is used in relation to the orientations of the Figure or Figures being described. As components of embodiments can be positioned in a number of differing orientations the directional terminology serves for illustration and is in no way limiting. It will be appreciated that other embodiments can be used and structural or logical modifications can be made without thereby departing from the scope of protection of the present invention. The following detailed description is not to be interpreted in a limiting sense. In the context of this description the terms "connected", "joined" and "integrated" are use to describe both a direct and also an indirect connection, a direct or indirect join and direct or indirect integration.

Unless otherwise specified the indefinite article and the definite article refer not just to an individual component but are to be interpreted as "at least one". The terminology includes the above-mentioned words, deviations therefrom and similar meanings. It should further be appreciated that the terms "approximately", "substantially" and similar terms in connection with the dimensions and a property of a component of the invention describe the described dimension and property not as a strict limit or parameter and do not exclude minor deviations therefrom, that are functionally similar. At least parts of description with numerical parameters also include variations in those parameters in accordance with mathematical and manufacturing principles in the state of the art, for example roundings, deviations and other systematic errors, manufacturing tolerances and so forth. Finally in relation to a plurality of identical components or elements, for reasons of clarity, only a respective one is denoted by a reference numeral.

DETAILED DESCRIPTION

Figure 1:
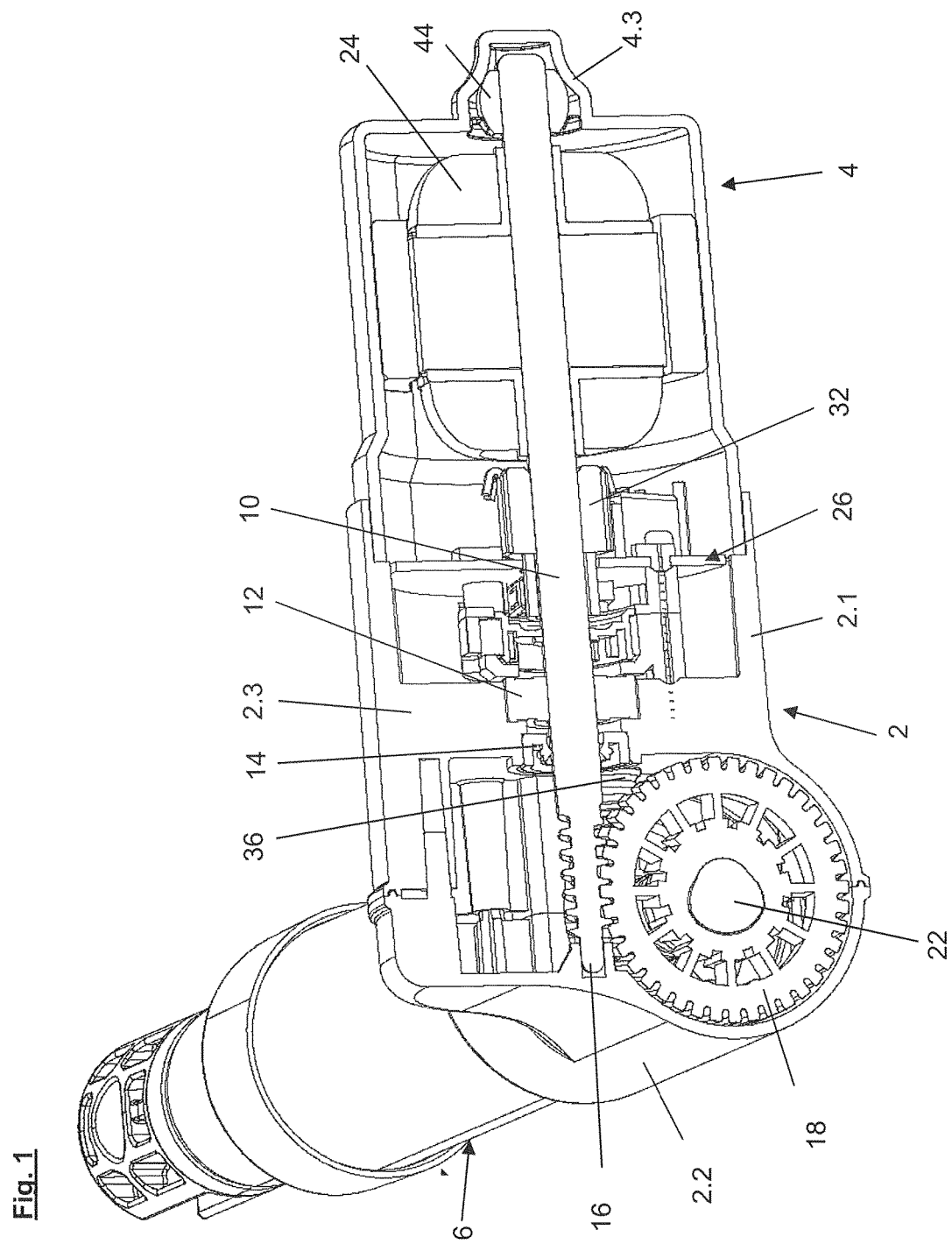
FIG. 1 shows a perspective cross-section through the transmission housing of a linear transmission according to the invention.
Figure 2:
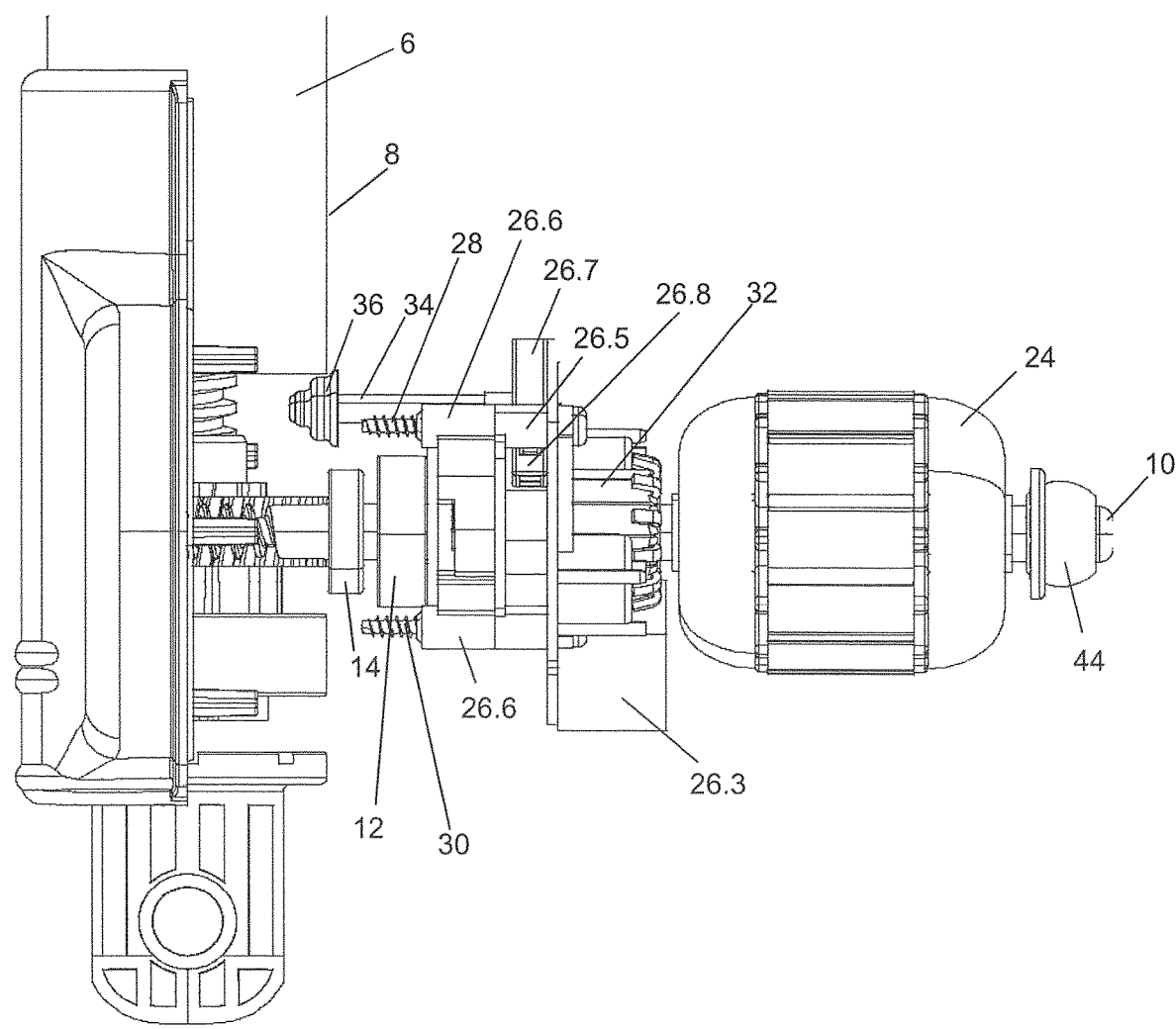
FIG. 2 shows a plan view of the linear transmission shown in FIG. 1 with the rear housing part removed.

Accordingly the linear drive according to the invention substantially comprises a transmission housing 2, a motor housing 4 which is fitted at the end into the transmission housing 2 and a hollow-cylindrical guide tube 6 in which a spindle nut 8 is longitudinally displaceable by way of the linear drive and which drives a lift tube 46.

The transmission housing 2 in turn includes two housing parts which can be fitted together at a join, namely a rear housing part 2.1 which is adapted to accommodate the motor housing 4 and a front housing part 2.2 which closes the transmission housing 2 and at the same time with the transmission housing 2 encloses the guide tube 6 in a shell-form configuration at both sides.

The rear housing part 2.1 has a substantially hollow-cylindrical internal space which is subdivided approximately at the center of the overall length of the rear housing portion 2.1 by a separating wall 2.3 extending transversely through that internal space, into a front housing portion towards the transmission and a rear housing portion towards the motor. A shaft 10 driven by an electric motor 24 projects into the front transmission region through a central through opening in that separating wall 2.3. The shaft 10 is supported in that separating wall 2.3 by means of a front shaft bearing 12 which in the present case is in the form of a rolling bearing. A radial shaft sealing ring 14 is fitted on the front side of the separating wall 2.3, that faces towards the transmission space, for sealing off the motor space. At the front free end of the shaft 12 it has a worm 16 meshing with the worm gear 18 extending transversely relative to the longitudinal axis of the shaft 10. That worm gear 18 is non-rotatably connected to a hollow-cylindrical spindle holder 20 into which the spindle 22 is in turn non-rotatably fitted. Finally, the spindle nut 8 runs on that spindle 22, which nut is thus displaceable by displacement in relation to the stationary guide tube 6 between an extension position determined by a front limit switch and a retraction position determined by a rear limit switch.

At the rear end the motor housing 4 has a substantially dome-shaped or nozzle-shaped bearing seat 4.3 which projects out of the rear wall and in which a rear shaft bearing 44 can be flush fitted, which supports the shaft 10 at the rear shaft end in the motor housing 4.

Arranged in the direction of the electric motor 24 in the motor portion of the transmission housing 2 is the interference suppression circuit board 26 according to the invention, more specifically being fixed by way of two spacer screws 28, 30 which are screwed into the separating wall 2.3.

Arranged in the direction of the electric motor 24 around or on the shaft 10 is a commutator 32 while provided on the rear side of the interference suppression circuit board 26, that faces towards the electric motor 24, are two diametrally opposed brushes in corresponding brush holders 26.1, 26.2 screwed on to the interference suppression circuit board 26. A relay 26.3 is also fitted on the rear side of the interference suppression circuit board, the relay switching the operating current of the electric motor 24 by means of the limit switches.

On the front side the interference suppression circuit board 26 has two threaded bushes 26.4, 26.5 for receiving the spacer screws 28, 30. In addition disposed on the front side of the interference suppression circuit board 26 is a limit switch 26.6 in which there engages a push rod 34 which projects through a corresponding opening in the separating wall 2.3 into the transmission portion of the transmission housing 2 and is media-tightly covered by way of a rubber cap 36. That push-rod 34 thus actuates the rear limit switch for limiting the retraction movement of the spindle nut 8 in the guide tube 6.

Figure 3:
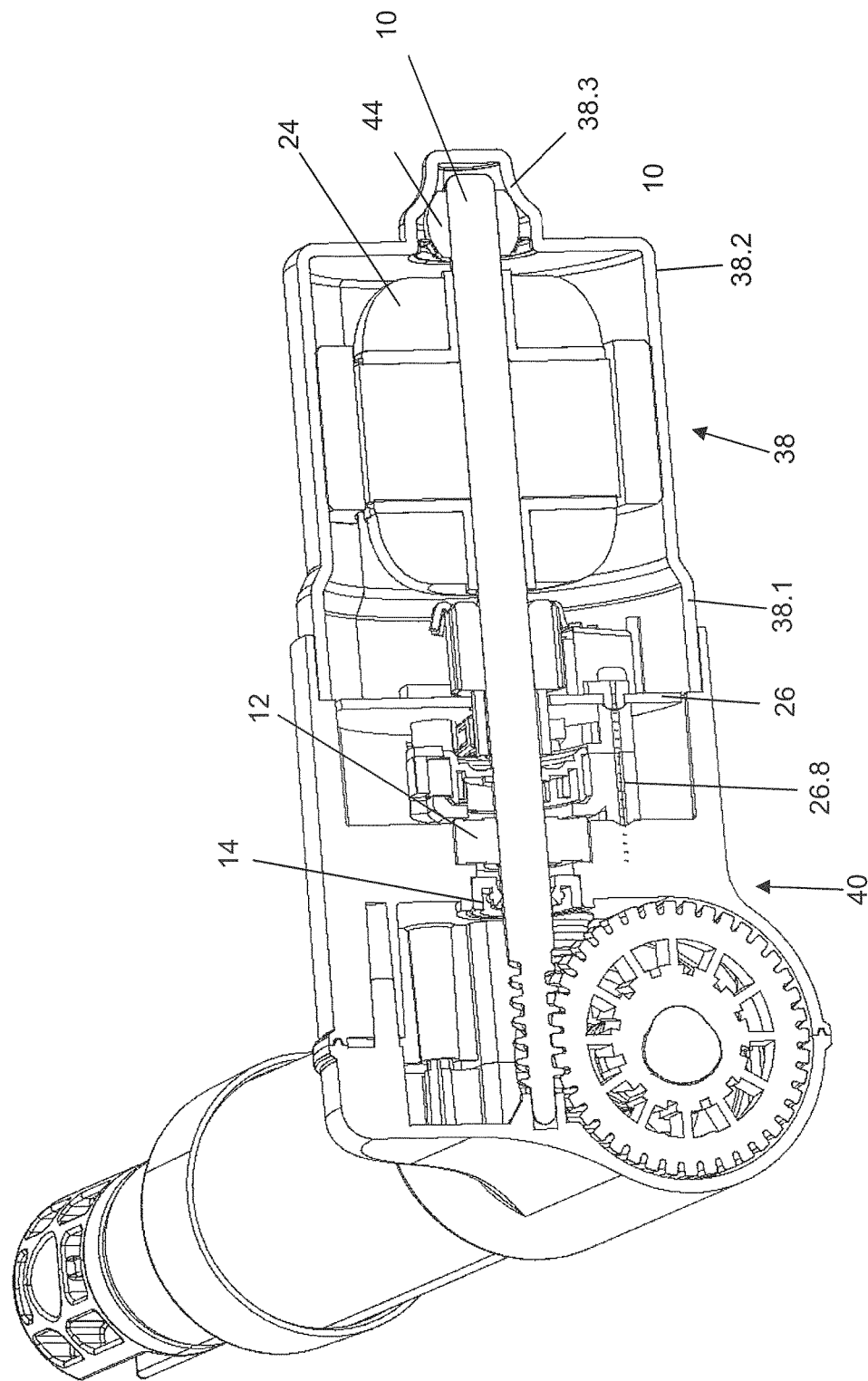
FIG. 3 shows a perspective cross-section of an alternative embodiment of the linear transmission according to the invention through the transmission and the motor housing.
Figure 4:
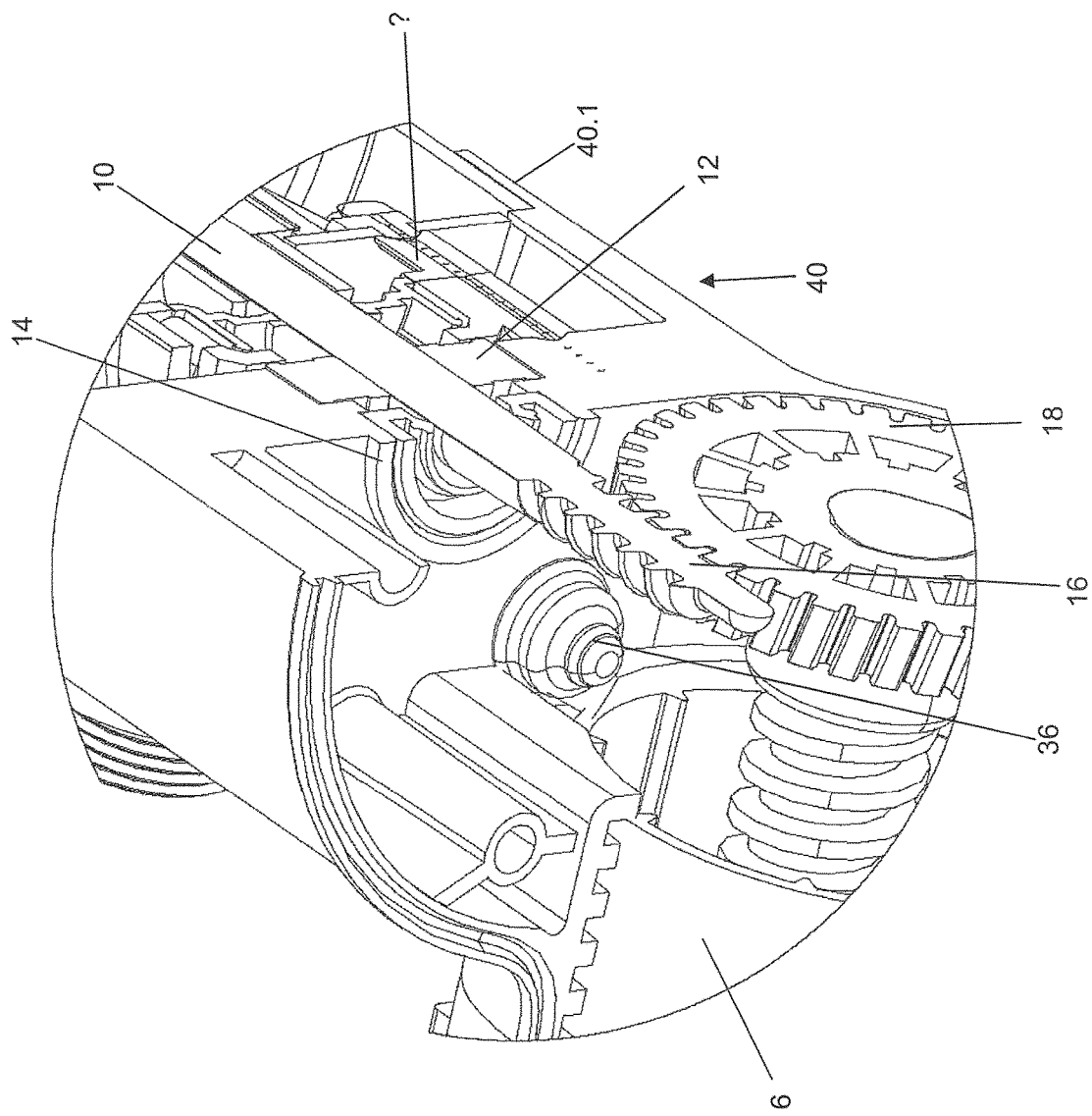
FIG. 4 shows an enlarged perspective front view of the transmission housing and the intermediate wall of the transmission housing.
Figure 5:
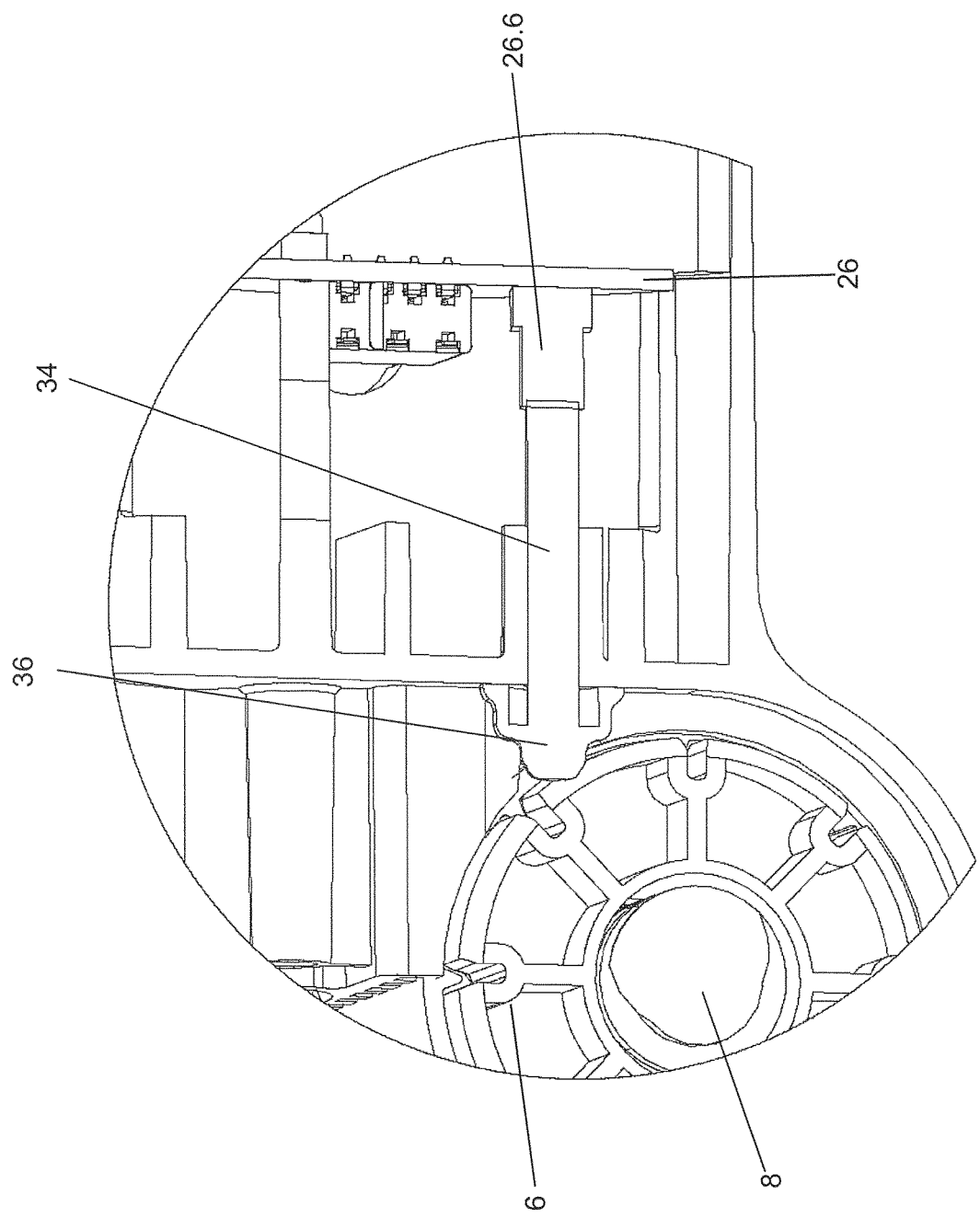
FIG. 5 shows an enlarged cross-section in detail to illustrate the limit switch.

FIGS. 3 and 4 show a linear transmission according to the invention of an alternative configuration. Therein the motor housing 38 has, in the front housing region which is fitted into the transmission housing 40, a front motor housing portion 40.1 which is radially outwardly enlarged in relation to a longer rear motor housing portion 40.2 for increasing stiffness with the formation of a step. That front motor housing portion 40.1 in the installed position sits in an internal inner step 40.1 of the transmission housing 40, at which the interference suppression circuit board 46 is also arranged.

Figure 6:
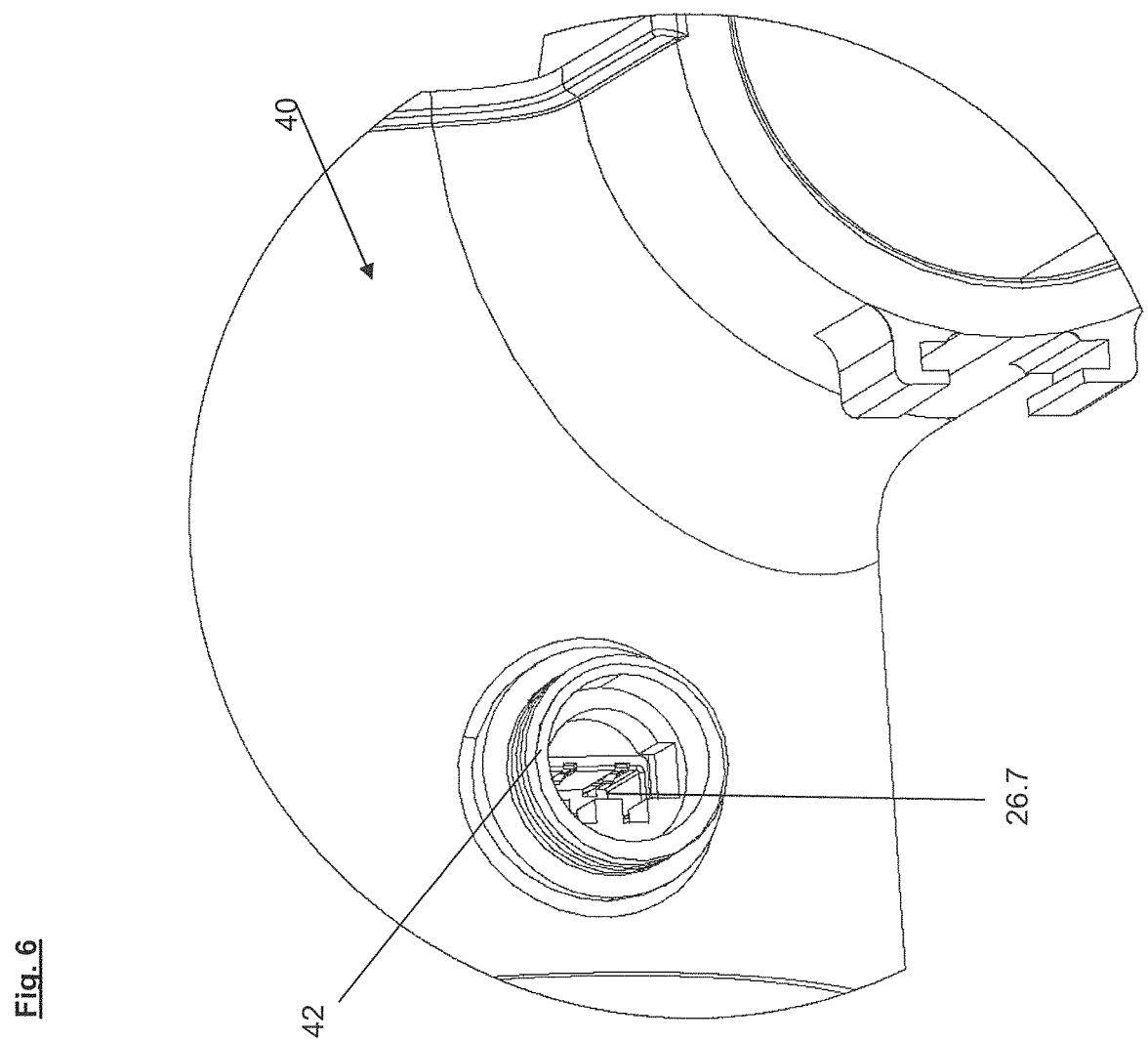
FIG. 6 shows an enlarged perspective detail view of the cable connection on the transmission housing.

Furthermore disposed on the interference suppression circuit board 26 is a cable plug 26.7 which projects radially laterally from the interference suppression circuit board 26 and which in the installed position can be non-rotatably fitted in a cylindrical cable connection 42 having an external fixing thread, as shown on an enlarged scale in FIG. 6. That design therefore provides for a sealed rotation-preventing fit of the cable plug 26.7 in the transmission housing 30.

As in the first embodiment the motor housing 28 at the rear end has a bearing insert 38.3 which projects substantially in a dome-shaped or nozzle-shaped configuration out of the rear wall of the motor housing 28 and into which a rear shaft bearing 44 can be fitted in flush relationship and which thus supports the shaft 10 at the rear end in the motor housing 28.

Figure 7:
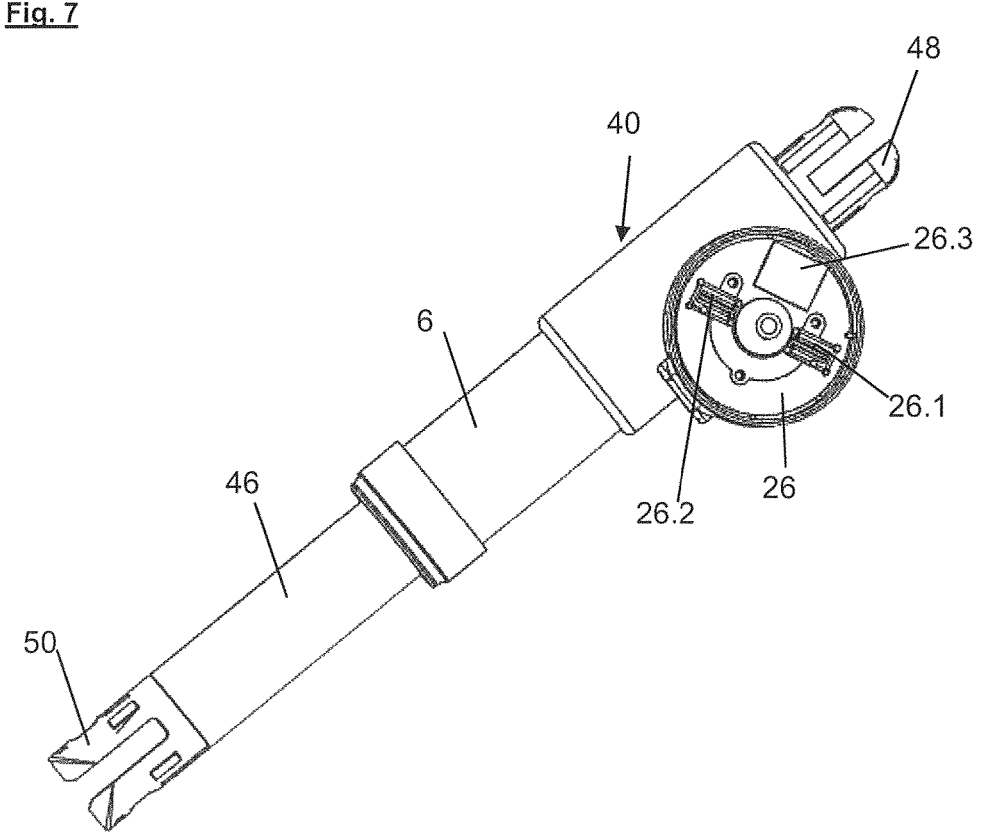
FIG. 7 shows a perspective view of the linear drive with the motor housing removed.

FIG. 7 shows a perspective plan view of the linear drive with the motor housing 4 removed, looking on to the interference suppression circuit board 26, the brush holders 26.1, 26.2 arranged thereon and the relay 26.3. Accordingly the linear drive at the rear end includes a rear fork head 50 which is fitted into the transmission housing 40 and which is arranged at the left in FIG. 7, while at the front end it has a front fork head 50 which is connected to a lift tube 46 and by way of which the linear drive can be fitted or arranged between two components to be displaced. That can be for example a sick bed which is connected with the rear end to a transverse strut of the bed frame and with the front fork head to a foot or head part of the bed or the frame, that is to be pivoted with respect to the frame.

LIST OF REFERENCES 2 transmission housing
2.1 rear housing part
2.2 front housing part
2.3 separating wall
4 motor housing
4.3 bearing insert
6 guide tube
8 spindle nut
10 shaft
12 front shaft bearing
14 radial shaft sealing ring
16 worm
18 worm gear 20 spindle holder
22 spindle
34 electric motor
26 interference suppression circuit board
26.1, 26.2 brush holder/brush carrier
26.3 relay
26.4, 26.5 threaded bush
26.6 limit switch
26.7 cable plug
26.8 Hall sensor
28, 30 spacer screws
32 commutator
34 push rod
36 rubber cap
38 motor housing
38.1 front motor housing portion
38.2 rear motor housing portion
38.3 bearing insert
40 transmission housing
40.1 internal step
42 cable connection
44 rear shaft bearing
46 lift tube
48 rear fork head
50 front fork head

What is claimed is:

1. A linear drive comprising:
a transmission housing,
a motor housing,
a rotor accommodated in the motor housing,
a shaft which is mounted on a rear shaft end in a rear shaft bearing and is mounted on a front shaft end,
an interference-suppressed electric motor which is connected to the transmission housing and is accommodated in the motor housing and, by way of the rotor, drives the shaft,
a commutator for current transmission to the rotor, electrical and/or electronic components for interference suppression of the electric motor,
wherein the shaft by means of a worm drives a transmission arranged in the transmission housing for displacement of a lift tube guided longitudinally displaceably in a guide tube,
wherein the rear shaft bearing is mounted in the motor housing, the front shaft bearing is arranged or mounted in the transmission housing and the electrical and/or electronic components required for interference suppression of the electric motor are arranged on an interference suppression circuit board arranged between the front shaft bearing and the commutator.

2. The linear drive as set forth in claim 1, wherein the interference suppression circuit board is arranged in the region between the transmission and the motor and outside the motor housing.

3. The linear drive as set forth in claim 1, wherein the interference suppression circuit board is arranged in the transmission housing.

4. The linear drive as set forth in claim 1, wherein the interference suppression circuit board includes carbon brushes for connection to the commutator.

5. The linear drive as set forth in claim 4, wherein the carbon brushes are arranged on a brush holder which is or can be connected to the interference suppression circuit board.

6. The linear drive as set forth in claim 1, wherein at least one limit switch is arranged on the interference suppression circuit board.

7. The linear drive as set forth in claim 1, wherein at least one relay and/or at least one Hall sensor is arranged on the interference suppression circuit board.

8. The linear drive as set forth in claim 1, wherein the motor housing is in the form of a deep-drawn steel casing.

9. The linear drive as set forth in claim 1, wherein the motor housing includes a bearing receiving means for the rear shaft bearing.

10. The linear drive as set forth in claim 9, wherein the bearing receiving means is in the form of a protruding projection of a reduced outside diameter for embracingly receiving or mounting the rear shaft bearing.

11. The linear drive as set forth in claim 1, wherein the interference suppression circuit board sits at the end in front of the motor casing, contacts the motor casing and together with the motor casing in the form of a steel casing forms a Faraday cage and the interference suppression circuit board thus forms a shield against the EMV disturbances in the interior of the motor.

12. The linear drive as set forth in claim 1, wherein the transmission housing includes a plurality of housing parts which are or can be releasably connected together.

13. The linear drive as set forth in claim 1, wherein the transmission includes a worm gear which meshes with the worm and which in turn can be non-rotatably connected to a spindle.

14. The linear drive as set forth in claim 13, wherein the spindle is non-rotatably received in a spindle holder which can be non-rotatably connected to the worm gear by way of a clutch.

15. The linear drive as set forth in claim 14, wherein running on the spindle is a spindle nut which is connected to the lift tube and which is held non-rotatably and axially displaceably in the guide tube and is displaceable along the longitudinal axis thereof.

16. The linear drive as set forth in claim 1, wherein the motor housing extends into the transmission housing and is sealingly connected thereto.

17. The linear drive as set forth in claim 10, wherein the motor housing has a rear housing portion of a smaller outside diameter and that adjoining said rear housing portion with a step is a front housing portion which is enlarged in relation to the rear housing portion by 10 to 20 percent and which can be connected to the transmission housing.

18. The linear drive as set forth in claim 1, wherein the interference suppression circuit board is arranged in the edge region of the motor housing and contacting of interference suppression circuit board is made with the housing directly or by way of interpositioned contact means.

19. The linear drive as set forth in claim 1, wherein the outside diameter of the interference suppression circuit board corresponds to the outside diameter of the steel casing of the motor housing.

* * * * *